April 18, 1933.  N. V. JOHNSON  1,903,817
PROPELLER BALANCE
Filed April 7, 1932   2 Sheets-Sheet 1
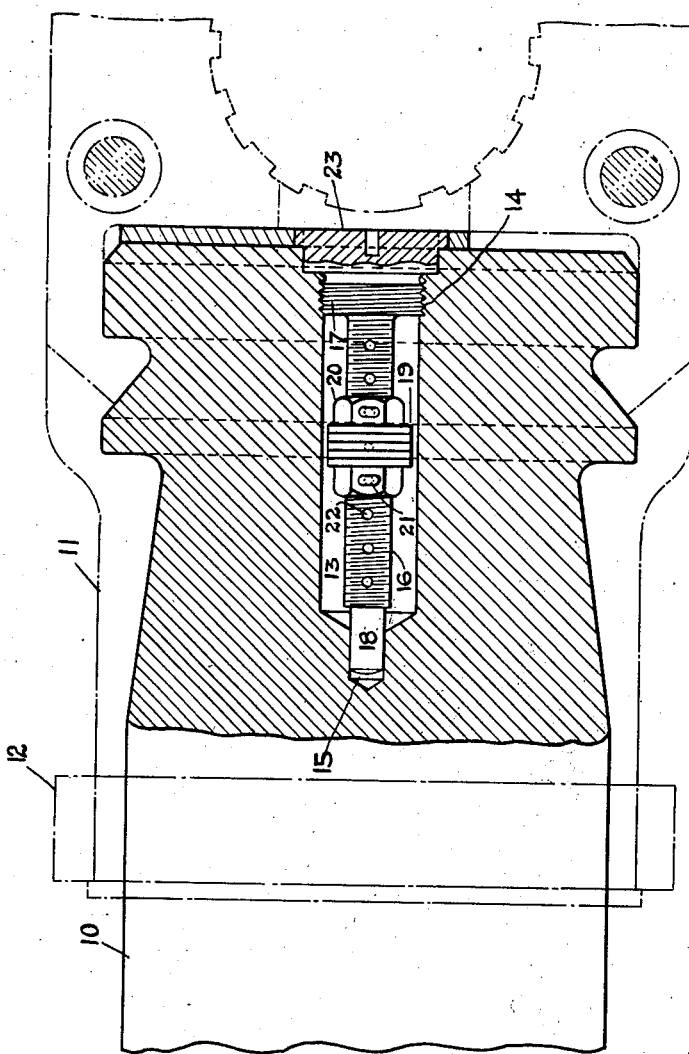
INVENTOR
NELSON V. JOHNSON
BY
ATTORNEY April 18, 1933.   N. V. JOHNSON   1,903,817
PROPELLER BALANCE
Filed April 7, 1932   2 Sheets-Sheet 2
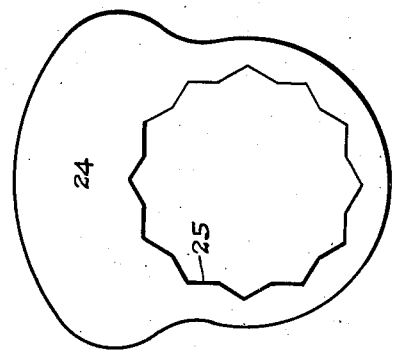
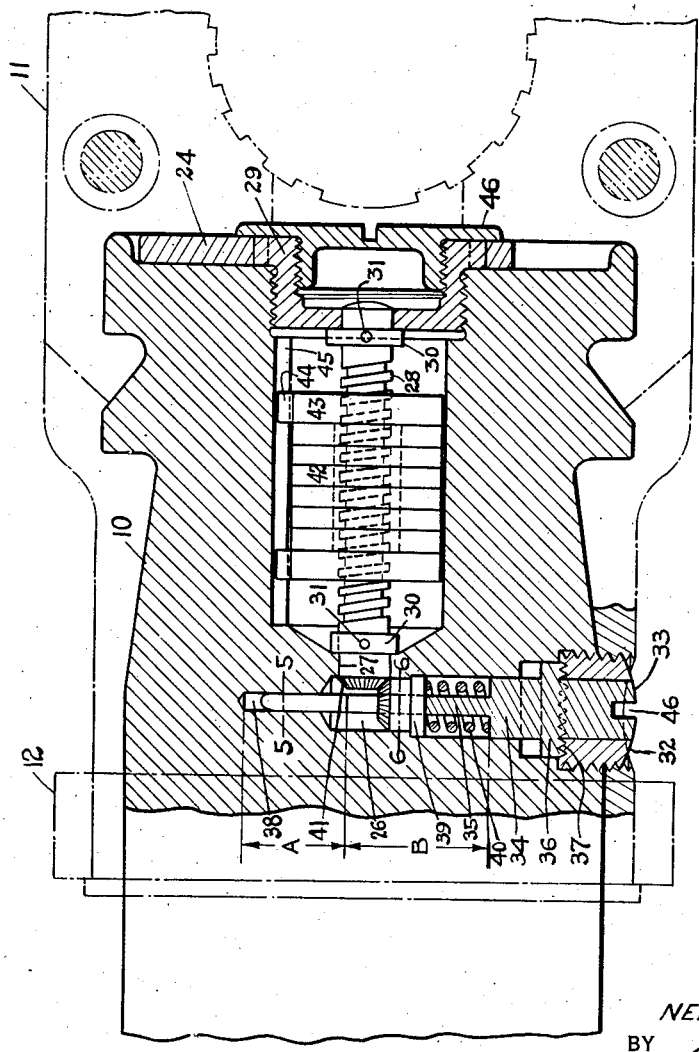
INVENTOR
NELSON V. JOHNSON
BY
ATTORNEY Patented Apr. 18, 1933

1,903,817

UNITED STATES PATENT OFFICE

NELSON V. JOHNSON, OF PHILADELPHIA, PENNSYLVANIA

PROPELLER BALANCE

Application filed April 7, 1932. Serial No. 603,825.

(GRANTED UNDER THE ACT OF MARCH 3, 1883, AS AMENDED APRIL 30, 1928; 370 O. G. 757)

My invention relates broadly to a propeller balance and more particularly to a microbalance for airplane propeller blades.

An object of my invention is to install means in propeller blades for balancing the same in either one/or both the longitudinal and transverse directions.

Another object of my invention is to provide in a propeller an adjustment for balancing that is accessible for inspection at all times and one that will eliminate to a great extent guess work.

A further object of my invention is to provide a propeller blade with a device for counter-balancing the propeller when the same is thrown out of balance by reason of surface nicks, scratches, water pits or other minor defects.

It is also an object of my invention to provide a balancing device in an aircraft propeller blade that is not involved in operation, simple and inexpensive to manufacture and easy to install.

With above and other objects in view, the invention consists in the construction, combination and arrangement of parts as will be described more fully hereinafter.

Reference is to be had to the accompanying drawings forming a part of the specification, in which like reference characters indicate corresponding parts throughout the several views, and in which:

Figure 1 is a portion of a propeller blade shown partly in section with my improved device installed therein.

Figure 2 is a weight used in my improved device.

Figure 3 is a portion of a propeller blade shown partly in section, with a modification of my improved device installed therein.

Figure 4 is a weight used in the modification.

Figure 5 is a sectional view on line 5—5 of Figure 3.

Figure 6 is a sectional view on line 6—6 of Figure 3.

Referring more particularly to the drawings, 10 indicates a propeller blade secured in a hub 11 by clamping ring 12. A cylindrical hole or chamber 13 having one end threaded as at 14 and a bearing opening 15 in the other end, is drilled into the hub end of the blade. Inserted in chamber 13 is a threaded stem 16 that is secured and positioned by plug portion 17 threaded into end 14 and bearing end 18 fitted into opening 15.

In order to properly balance the blade longitudinally, a variable number of weights 19, depending upon the degree of balance necessary, are placed on stem 16 and securely held in the proper place by means of adjustable nuts 20 and cotter pins 21 that pass through nuts 20 and evenly spaced holes 22 in stem 16.

To balance the blade in a transverse direction, the plug 17 has integral therewith a head 23 which overlaps and fits tight against the end of the blade when stem 16 is in position. The head 23 has a number of angular sides by means of which a weight 24 having an aperture 25 shaped to correspond to the angular sides of head 23 can be fitted to the head. Thus for the purpose of illustration, I have shown the weight 24 with an aperture having twelve equal angular sides so that the same can be fitted around head 23 in twelve different positions.

In the practical use of my invention, stem 16 with weights 19 secured in position is inserted into chamber 13; the blade is then placed in the hub and tested for longitudinal balance against a master blade. If out of balance, the blade is removed, weights reset and/or increased or decreased, then the blade is again replaced in the hub for test. This procedure of trial and error is repeated until the blade is balanced in the longitudinal direction, after which the blade is tested for transverse balance the position or size of weight 24 changed until the propeller blade has attained the maximum degree of balance with the master blade.

Figure 3 shows a modified form of my improved propeller balance, wherein the micrometric adjustment of the longitudinal balance of the propeller blades can be obtained after the blades are secured in the hub. In this modification, I provide in addition to chamber 13, a transverse chamber 26 and the interconnecting aperture 27 between the two chambers. A screw stem 28 having one end rotatably fitted into and bearing on the circumference of aperture 27 and the other end mounted for rotation in a plug 29 that is screwed into the base of the blade to close the end of chamber 13, is held against displacement by means of collars 30 secured thereto by keys 31.

Threaded into the end of chamber 26 is a plug or cap 32 having movably positioned in the center thereof head 33 of the plunger 34 which has integral therewith stem 35. This plunger 34 is locked in place by a notched surfaced shoulder 36 engaging with notches 37 on the inner surface of cap 32. The lower portion, as shown by A, of stem 35 is round so as to rotate and slide in a bearing 38 formed at the inner end of chamber 26 and the upper portion, indicated by B, of the stem is square in order to operate a floating gear 39 positioned thereon. A helical spring 40 placed around stem 35 between the floating gear 39 and shoulder 36 of plunger 34, not only holds the plunger locked by the notches of 36 engaging with notches 37 but also holds gear 39 in mesh with a bevel gear 41 secured to end of stem 28.

The longitudinal balance weights 42 are placed on stem 28 between two traveling nuts 43 which have a protruding portion 44 extending into a groove 45 whereby the nuts will move back and forth on the threaded part of the stem 28 so as to properly position the weights. The transverse weight 24 is placed around plug 29 and held firmly in place by nut 46 threaded into the plug.

In the operation of the modified form of my improved device the transverse balance of the blade is first obtained by trial and error tests and the readjustment of weight 24. After this the blade is made secure in the hub and adjustments are then made for the longitudinal balance. Pressure is placed upon plunger 34 by either a screw driver or suitable tool inserted in slot 46 of the head 33 to disengage the notches 36 and 37 which are held in engagement by spring 40. In pressing down on the plunger head 33, the round end of the stem 35 slides in bearing 38 and the square portion of the stem slides through the floating gear 39 and by turning the plunger when spring 40 is compressed the floating gear 39 turns gear 41 and causes the nuts 43 to travel with the weights 42 in the desired direction to correct the balance.

The number and size of weights used in the both forms of my improved balance may be changed at any time by removing the blade from the hub.

It will be understood that the above description and accompanying drawings comprehend only the general and preferred embodiment of my invention and that various changes in construction, proportion and arrangement of parts may be made within the scope of this invention and the appended claims, without sacrificing any of the advantages thereof.

The herein described invention may be manufactured and used by or for the Government of the United States for governmental purposes without the payment to me of any royalties thereon or therefor.

What I claim is:

1. A propeller comprising a hub, blades detachably secured in said hub, and adjustable means secured to and in the blades for varying the balance of said blades.

2. A propeller comprising a hub, blades detachably secured in said hub, and adjustable means in the hub end of said blades for balancing the blades in either or both the longitudinal and transverse directions.

3. In an aeronautical propeller blade, a chamber in the hub end thereof, a threaded stem having a supporting plug, removably secured in said chamber, means adjustably secured to said stem for balancing the blade in the longitudinal direction, and means placed around said supporting plug for balancing the blade in the transverse direction.

4. In an aeronautical propeller blade, a chamber in the hub end thereof, a threaded stem, means supporting said stem in the chamber, balance weights, adjustable retaining nuts positioning said weights on the stem, and means for locking said nuts when the blade is balanced in the longitudinal direction.

5. In an aircraft propeller blade, a chamber in the hub end thereof, a threaded stem removably secured in said chamber, balance weights, adjustable retaining nuts positioning said weights on the stem, means for locking said nuts in place, and adjustable means for balancing the blade in the transverse direction.

6. An aircraft propeller comprising a hub, blades secured in said hub, adjustable means for balancing said blades in the longitudinal direction, and means for actuating said adjustable balancing means without disassembling the propeller.

7. In an aircraft propeller, a hub, blades secured in said hub, and means for balancing each blade in the longitudinal direction after the blade is secured in the hub, said means comprising a threaded shaft or stem, means rotatably mounting the stem in the hub end of the blade, one or more weights placed on said stem, traveling nuts threaded on the stem and adapted to change the position of said weights when the stem is rotated and means adapted to be operated from the outside of said hub for rotating said stem.

8. In an aircraft propeller, a hub, blades removably secured in said hub, means for balancing said blades in the transverse direction, and means for balancing each one of the blades in the longitudinal direction when the blades are in the hub, said latter means comprising a longitudinal chamber in the hub end of the blade, a transverse chamber connected with said first chamber and extending through the outer periphery of the hub, a rotatable screw stem mounted in the longitudinal chamber and extending into the transverse chamber, a gear mounted on the end of said stem in the transverse chamber, a plunger having a floating gear adapted to mesh with said first mentioned gear, means for locking said plunger, weights placed on said stem, and traveling nuts threaded on the stem and adapted to change the position of the weights when the stem is rotated through the plunger and floating gear.

NELSON V. JOHNSON.